US011640231B1

(12) United States Patent
Chung et al.

(10) Patent No.: US 11,640,231 B1
(45) Date of Patent: May 2, 2023

(54) ENHANCED ACCESSIBILITY USER INTERFACE FOR SPACE ASSIGNMENT ON A FLOORPLAN

(71) Applicant: VMware, Inc., Palo Alto, CA (US)

(72) Inventors: Kira Chung, Atlanta, GA (US); Ajayan Subramanian, Atlanta, GA (US)

(73) Assignee: VMware, INC., Palo Alto, CA (US)

( * ) Notice: Subject to any disclaimer, the term of this patent is extended or adjusted under 35 U.S.C. 154(b) by 18 days.

(21) Appl. No.: 17/450,511

(22) Filed: Oct. 11, 2021

(51) Int. Cl.
*G06F 3/0482* (2013.01)
*G06F 3/04845* (2022.01)
*G06F 3/04812* (2022.01)

(52) U.S. Cl.
CPC ........ *G06F 3/0482* (2013.01); *G06F 3/04812* (2013.01); *G06F 3/04845* (2013.01)

(58) Field of Classification Search
CPC ................................................ G06F 3/048–05
See application file for complete search history.

(56) References Cited

U.S. PATENT DOCUMENTS

| 10,515,180 | B1* | 12/2019 | Sharma | G06F 30/398 |
|---|---|---|---|---|
| 11,356,519 | B2* | 6/2022 | Tiwari | H04W 8/005 |
| 2015/0058253 | A1* | 2/2015 | Cho | G06F 3/0484 |
| | | | | 705/346 |
| 2015/0120360 | A1* | 4/2015 | Adriaenssens | G01V 8/10 |
| | | | | 705/7.16 |
| 2016/0004694 | A1* | 1/2016 | Cornaby | G06F 16/185 |
| | | | | 715/734 |
| 2017/0315697 | A1* | 11/2017 | Jacobson | H04L 12/281 |
| 2018/0329617 | A1* | 11/2018 | Jones | G06F 3/04847 |
| 2019/0087076 | A1* | 3/2019 | Dey | G06F 3/0486 |

\* cited by examiner

*Primary Examiner* — Daniel Rodriguez
(74) *Attorney, Agent, or Firm* — Thomas | Horstemeyer, LLP (57) ABSTRACT

Various examples are described for improving accessibility in a user interface. A is generated to manipulate a floorplan. A list user interface element can be included that allows a user to assign unassigned locations in a floorplan without having to drag and drop within the user interface.

20 Claims, 7 Drawing Sheets

ENHANCED ACCESSIBILITY USER INTERFACE FOR SPACE ASSIGNMENT ON A FLOORPLAN

BACKGROUND

Tools that assist with managing a physical environment in an enterprise often rely upon visual representations of a floor or building, such as a floorplan. The floorplan can display an overhead view of a floor along with visual representations of the offices, cubicles, workspaces, and other resources on the floor, such as desks, printers, monitors, docking stations, conference rooms, and other resources that can be made available to users in an enterprise environment.

Management tools can be utilized by administrative users, or admins, to manage the physical resources in an enterprise environment. Management of these resources can involve permanent or temporary assignment of a resource to a user or group of users, allowing resources to be reserved or booked by users, generating maps or guides that can assist users with locating resources in a physical environment, and other management tasks that admins of office space can be tasked with.

These management tools often rely upon images, portable document format (PDF) files, or other visual representations of a floorplan to be uploaded to the management tool. However, translating the visual representation of the floorplan into a usable data object that can be manipulated by the management tool can be a cumbersome and often manual process.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to improving accessibility in a user interface. In some examples, the user interface can be one that is generated to manipulate a floorplan that is uploaded to a space planning tool. The space planning tool can also facilitate assignment or reservation of areas and resources within an office environment. Through an administrator console, space planners can view a floorplan corresponding to one or more floors of a facility. Administrators can define attributes associated with locations within the facility, assign locations to one or more users, make reservations for locations within the facility, make locations reservable through a reservation system, and perform other actions to manage physical resources and locations on a floorplan.

Some locations within a facility can be associated with attribute data. For example, a location can be associated with different types, such as an office, conference room, cubicle, desk, or other types of locations within an office environment. Additionally, a location can be associated with attributes, such as the type or quantity of seating available, whether the location is reservable, technology resources associated with the location, such as the type or quantity of displays, conference room technology, and other resource attributes. Locations can also be identified by a text identifier that is unique with respect to other text identifiers associated with locations on the floorplan or within an enterprise.

Locations can be identified using the text identifier in a floorplan file that contains a visual representation of the floorplan. The text identifier can be included as text in or near the location on the visual representation of the floorplan. A floorplan attribute file can be provided by an administrator that identifies the various resource attributes associated with locations in a floorplan. The floorplan attribute file can identify locations in a floorplan by including a text identifier associated with the respective locations. The attribute file can comprise a spreadsheet, a comma-separated values file, a chart, or another structured data file that identifies the locations and their respective attributes.

In many cases, a space management tool can automatically match entries in the attribute file to locations in a floorplan file using a text identifier associated with a location in the floorplan that is also present in an entry in an attribute file. However, in some cases, the attribute file may not identify all locations in a floorplan. For example, there could be locations designated in a floorplan file that are missing from the attribute file. Additionally, there could be locations identified in the attribute file that are missing from the floorplan file. Therefore, the space management tool can require an administrator to assign entries in an attribute file to a location in a visual representation of the floorplan file. One way to accomplish this user interaction is to require the user to drag and drop an entry from a list of unassigned entries in the attribute file to the visual representation in the floorplan file. However, the drag and drop gesture or procedure is not an accessibility friendly user interaction. Accordingly, an administrator with a disability may struggle with this interaction to perform a task that can be required in a user interface generated by the space management tool.

Additionally, a drag and drop interaction requires multiple gestures or "mouse clicks" to place a single unassigned location from a list onto the visual representation of the floorplan. Therefore, examples of the disclosure can provide an accessibility friendly mechanism by which an administrator can assign unassigned locations from a list user interface element to a visual representation of an object, such as a visual representation of a floorplan.

Figure 1:
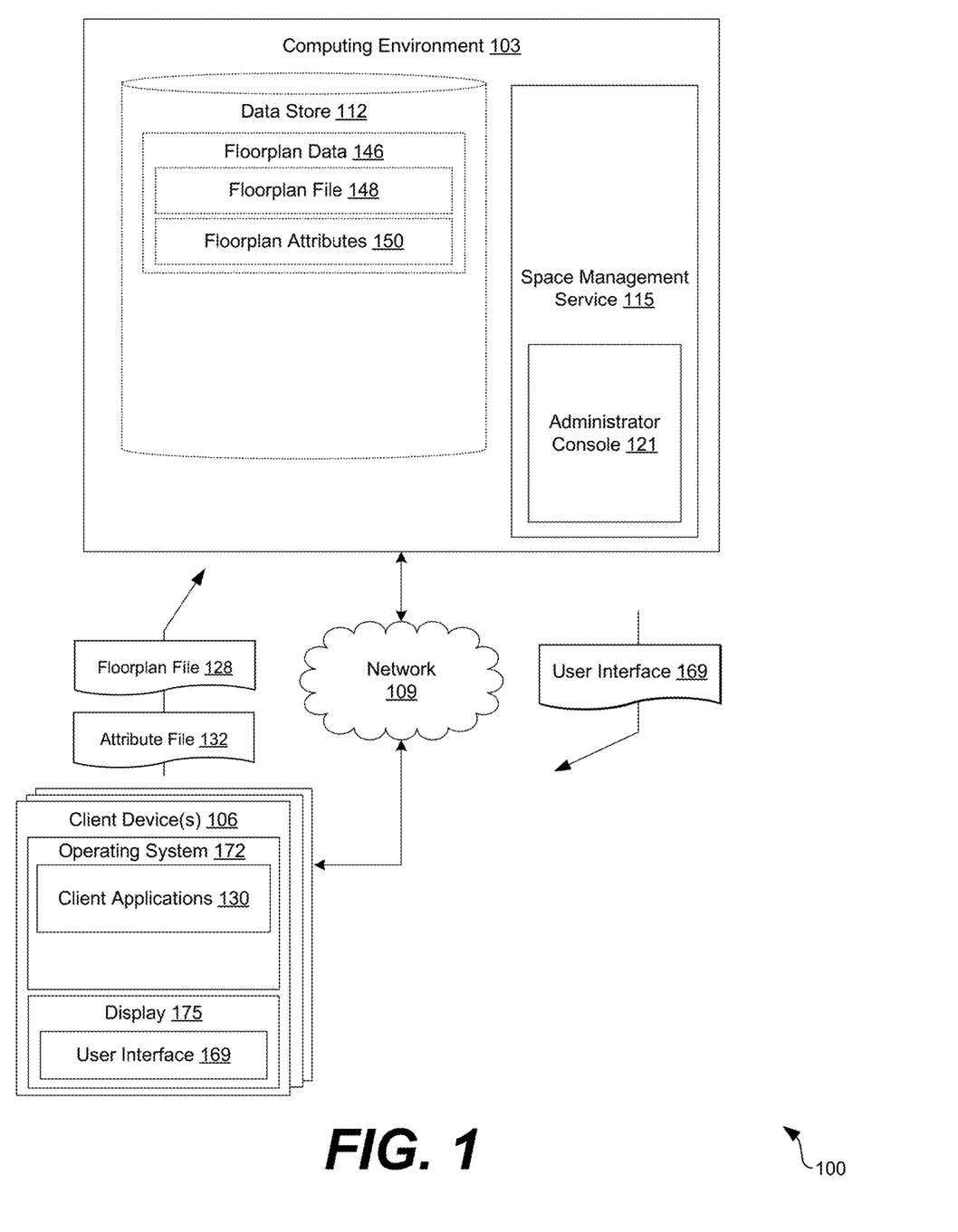
FIG. 1 is a drawing of a networked environment according to examples of the disclosure.

Turning now to FIG. 1, an example of a networked environment 100 is shown. The networked environment 100 can include a computing environment 103 and one or more client devices 106 in data communication with one other over a network. The network can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include one or more computing devices that are arranged, for example, in a server bank, computer bank, or other arrangement. The computing environment 103 can include a grid computing resource or any other distributed computing arrangement. The computing devices can be located in a single installation or can be distributed among many different geographical locations.

The computing environment 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 106 remotely over the network, the computing environment 103 can be described as a remote computing environment 103.

The data store 112 can include memory of the computing environment 103, mass storage resources of the computing environment 103, or any other storage resources on which data can be stored by the computing environment 103. The data stored in the data store 112, for example, can be associated with the operation of the various applications or functional entities described below.

The components executed on the computing environment 103 can include, for example, a space management service 115 as well as other applications, services, processes, systems, engines, or functionality not discussed in detail herein. While the device data evaluation service 118 is shown separate from the space management service 115, in some examples, the device data evaluation service 118 may include logic or other sub-component of the space management service 115.

The space management service 115 can allow an administrator to manage office space in an enterprise environment. The space management service 115 can allow administrators to visualize a floorplan corresponding to a floor of an office space environment. The space management service 115 can also allow administrators to assign locations or resources within a floorplan to users. The space management service 115 can also allow administrators to define properties or resources that are associated with locations on a floorplan. The space management service 115 can generate a user interface 169 that can be provided to an administrator via a client device 106.

The user interface 169 can be rendered by the client devices 106 in a browser or in a special purpose application running on a client device 106. According to aspects of the disclosure, the user interface 169 can provide accessibility enhanced user interface elements that can facilitate assignment of locations defined by an attribute file to a location in a visual representation of a floorplan file.

The data stored in the data store 112 can include, for example, floorplan data 146 as well as other data. Floorplan data 146 can include data pertaining to a floorplan that can be managed using the space management service 115. The floorplan data 146 can include information about a particular floorplan that is provided to the space management service 115. Floorplan data 146 can include a floorplan file 148 that is a visual representation of a floorplan corresponding to one or more floors in a facility that can be managed by the space management service 115. The floorplan file 148 can be a portable document format (PDF) file that includes a visual representation of a floorplan. The visual representation can comprise a line drawing or schematic drawing of a floorplan. The floorplan file 148 can also be an image file or another file type in which a visual representation of a floorplan can be embedded. The floorplan file 148 can also include text identifiers that identify respective locations in a floorplan. The text identifiers can be embedded as text within a PDF, for example, or the space management service 115 can perform optical character recognition (OCR) to extract text identifier identifying locations within the floorplan file 148. A text identifier identifying a location can represent an identifier that is unique with respect to other identifiers in a floorplan or with respect to all floorplans associated with a given enterprise.

Floorplan data 146 can also include floorplan attributes 150. Floorplan attributes 150 can represent information about a floorplan that can be managed using the space management service 115. Floorplan attributes 150 can include a type associated with the location, such as whether there is a desk, a type of desk. The floorplan attributes 150 can also specify whether the location is an office, cubicle, a conference room. The floorplan attributes 150 can also specify a text identifier associated with a location. Floorplan attributes 150 can further specify features or other properties of a location, such as whether there are display devices available to be used, how many devices are available, whether there is a printer, additional seating, and other aspects of a location that can be specified within an office environment.

In various examples, the space management service 115 can generate a user interface 169 with which users can interact using a client devices 106. The user interface 169 can allow an administrator or space planner to visualize, edit, and otherwise administer a floorplan. The user interface 169 can allow a user to upload a floorplan file 128 that includes a visual representation of a floorplan as well as text identifiers for one or more locations in the floorplan. The user interface 169 can display the visual representation of the floorplan file 128.

The user interface 169 can also allow the user to upload an attribute file 132 that can specify the various attributes about the locations in a floorplan. The attributes can be selected from a predefined set of attributes that are supported by the space management service 115 in some examples of the disclosure. The attribute file 132 can identify the location using a text identifier, similar to the floorplan file 128.

The space management service 115 can ingest the floorplan file 128 and the attribute file 132 and match the text identifiers associated with locations defined in the attribute file 132 to locations that are marked by matching text identifiers in the floorplan file 128. The space management service 115 can automatically assign locations specified by the attribute file 132 to locations within the floorplan file 128. In some instances, an attribute file 132 may define attributes for a location and specify a location identifier that cannot be located within the floorplan file 128. Accordingly, the space management service 115 can present a user interface 169 that requests a user to specify where in the visual representation of the floorplan file 128 that the unassigned text identifiers should be placed.

Such a user interface 169 can be provided by the space management service 115 using an administrator console 121. The administrator console 121 can include user interface elements that improve accessibility of assigning locations within a visual representation of a floorplan file 128 according to examples of the disclosure.

The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, a peripheral device, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include an operating system 172 configured to execute various client applications 130, such as the agent application 124, as well as other applications. Some client applications 130 can access enterprise data 154 and other network content served up by the computing environment 103 or other servers, thereby rendering a user interface 169 on a display 175. To this end, some client applications 130 can include a browser or a dedicated application, and a user interface can include a network page, an application screen, or other interface. Further, other client applications 130 can include device management applications, enterprise applications, social networking applications, word processors, spreadsheet applications, media viewing applications, or other applications.

Figure 2:
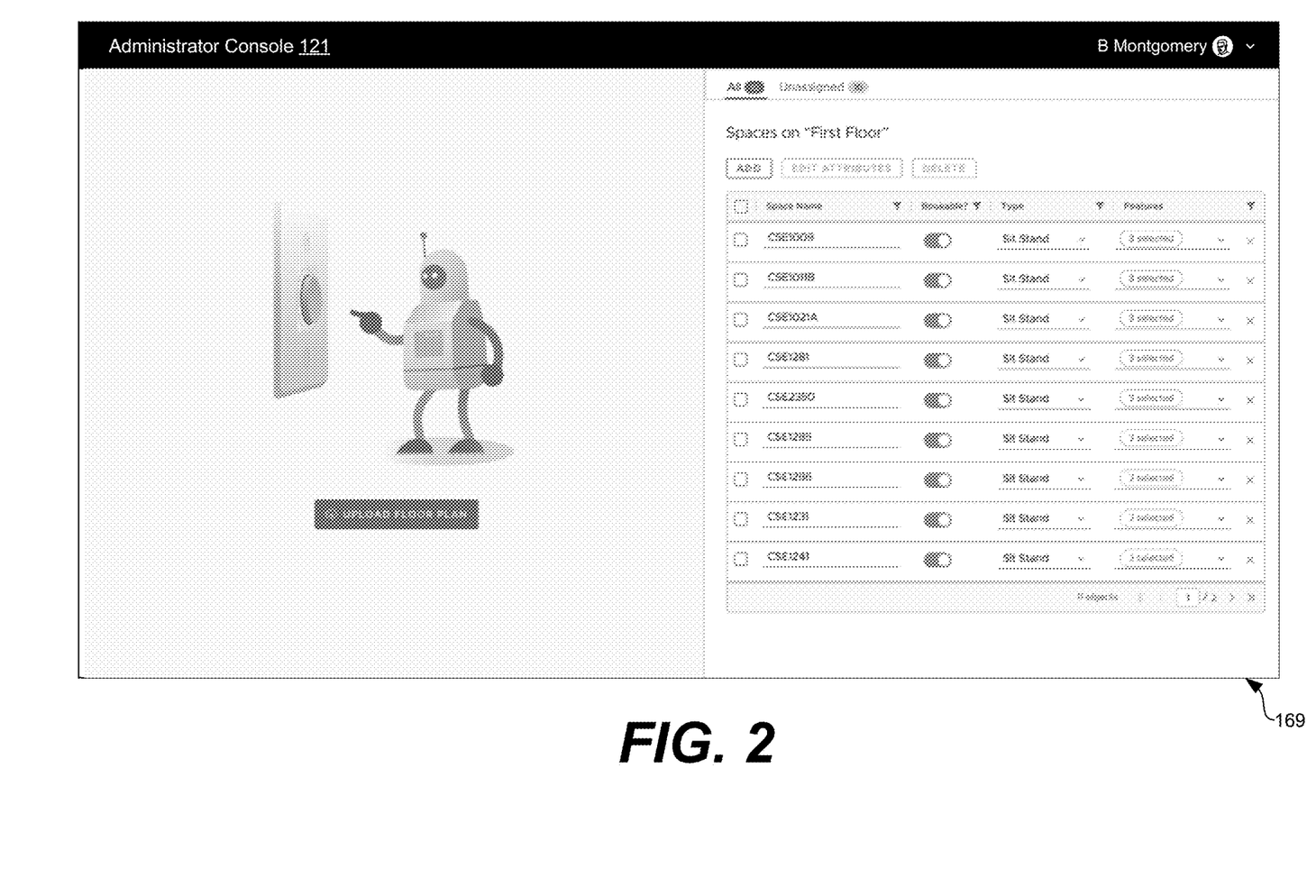
FIG. 2 is an example user interface according to examples of the disclosure.

Referring next to FIG. 2, an example of a user interface 169 is shown. More specifically, the user interface 169 of FIG. 2 can include a portion of the administrator console 121 that permits an administrator manage floorplans using the space management service 115. In the example of FIG. 2, the user has uploaded an attribute file 132 specifying various locations within a floorplan. The attribute file 132 can identify the locations using a text identifier as described above. The text identifier can comprise an alphanumeric identifier that is unique with respect to the floorplan and/or within a set of floorplans associated with an enterprise.

In the example of FIG. 2, the user has not yet uploaded a floorplan file 128 corresponding to the uploaded attribute file 132. It should be noted that the order in which users upload a floorplan file 128 or an attribute file 132 can be reversed. Returning to FIG. 2, the user interface 169 can prompt the administrator to upload a floorplan file 128 that corresponds to the uploaded attribute file 132 that the space management service 115 has processed by displaying the attribute data within the user interface 169.

Figure 3:
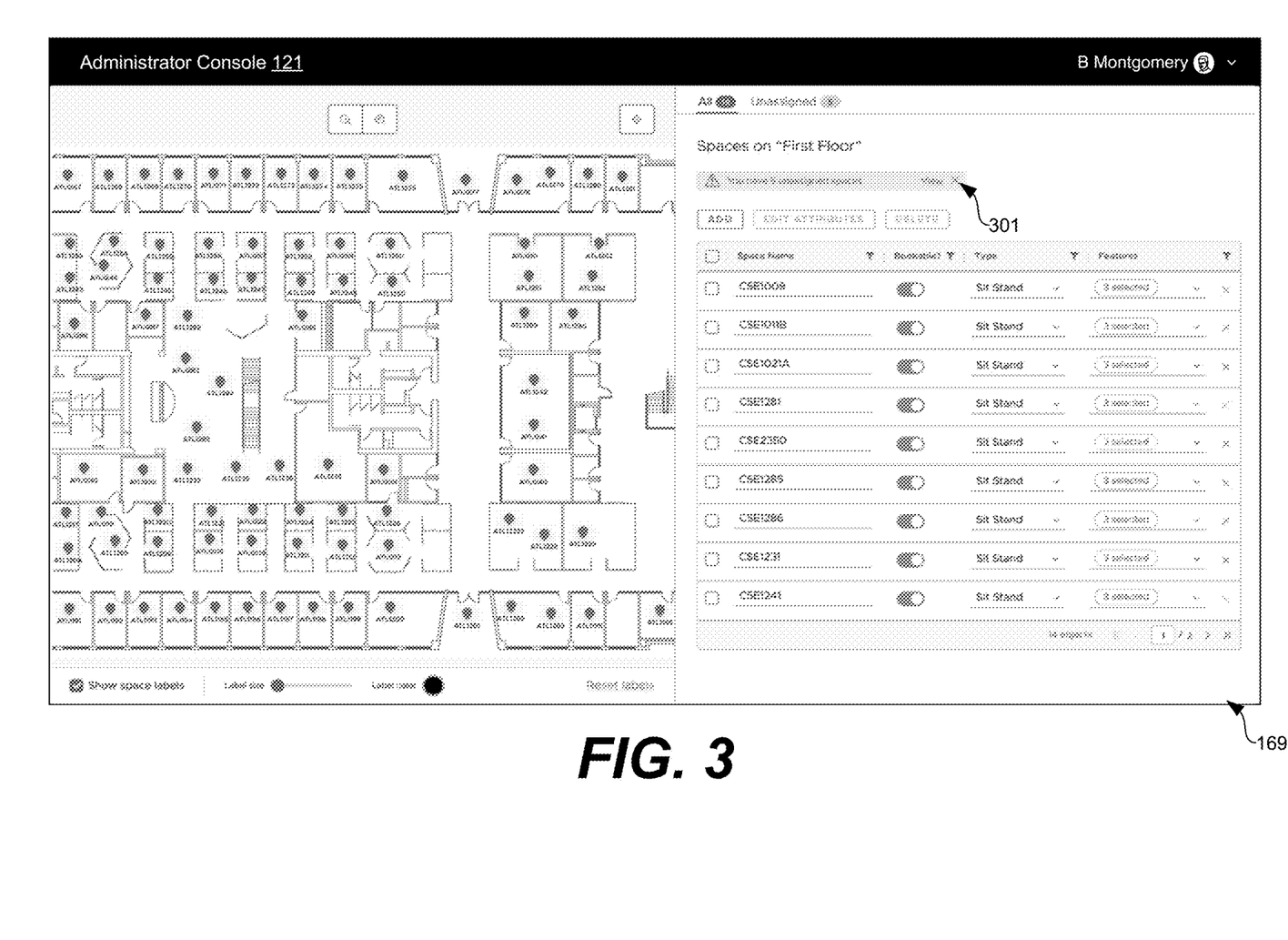
FIG. 3 is an example user interface according to examples of the disclosure.

Continuing the example of FIG. 2, reference is now made to FIG. 3. In FIG. 3, the user has uploaded a floorplan file 128. The floorplan file 128 contains a visual representation of a floorplan that can be managed by the space management service 115. The floorplan file 128 can also include text identifiers corresponding to at least some of the locations within the floorplan. In one example, the text identifiers can be embedded as text within a PDF provided as the floorplan file 128. In another example, the floorplan file 128 can comprise an image file, and the space management service 115 can perform optical character recognition to identify text identifiers embedded within the image file.

The space management service 115 can generate a user interface 169 that visualizes the floorplan as well as information extracted from the attribute file 132 provided by the user. In one example, the space management service 115 can match text identifiers detected within the floorplan file 128 within text identifiers present in the attribute file 132. The space management service 115 can render an indicator on or near a text identifier within the floorplan file 128 to indicate that the location has been identified within the attribute file 132 and the floorplan file 128. The indicator can be a pin or other user interface element that is on top of or near the corresponding text identifier within the visual representation of the floorplan file 128.

Data pertaining to the location that is extracted from the attribute file 132 can be stored in the data store 112 and associated with a particular floorplan. The attribute data can be extracted from the attribute file 132 and data about each location within a floorplan can be separately stored in the data store 112 by the space management service 115.

As shown in the user interface 169 of FIG. 3, the space management service 115 can also identify unassigned locations, or unassigned text identifiers. The space management service 115 can identify unassigned locations by locating text identifiers in the attribute file 132 that cannot be located or matched to a corresponding text identifier within the floorplan file 128. In the example of FIG. 3, the space management service 115 can display an indicator 301 within the user interface 169 that can inform the user about the unassigned spaces that were identified in the attribute file 132.

Figure 4:
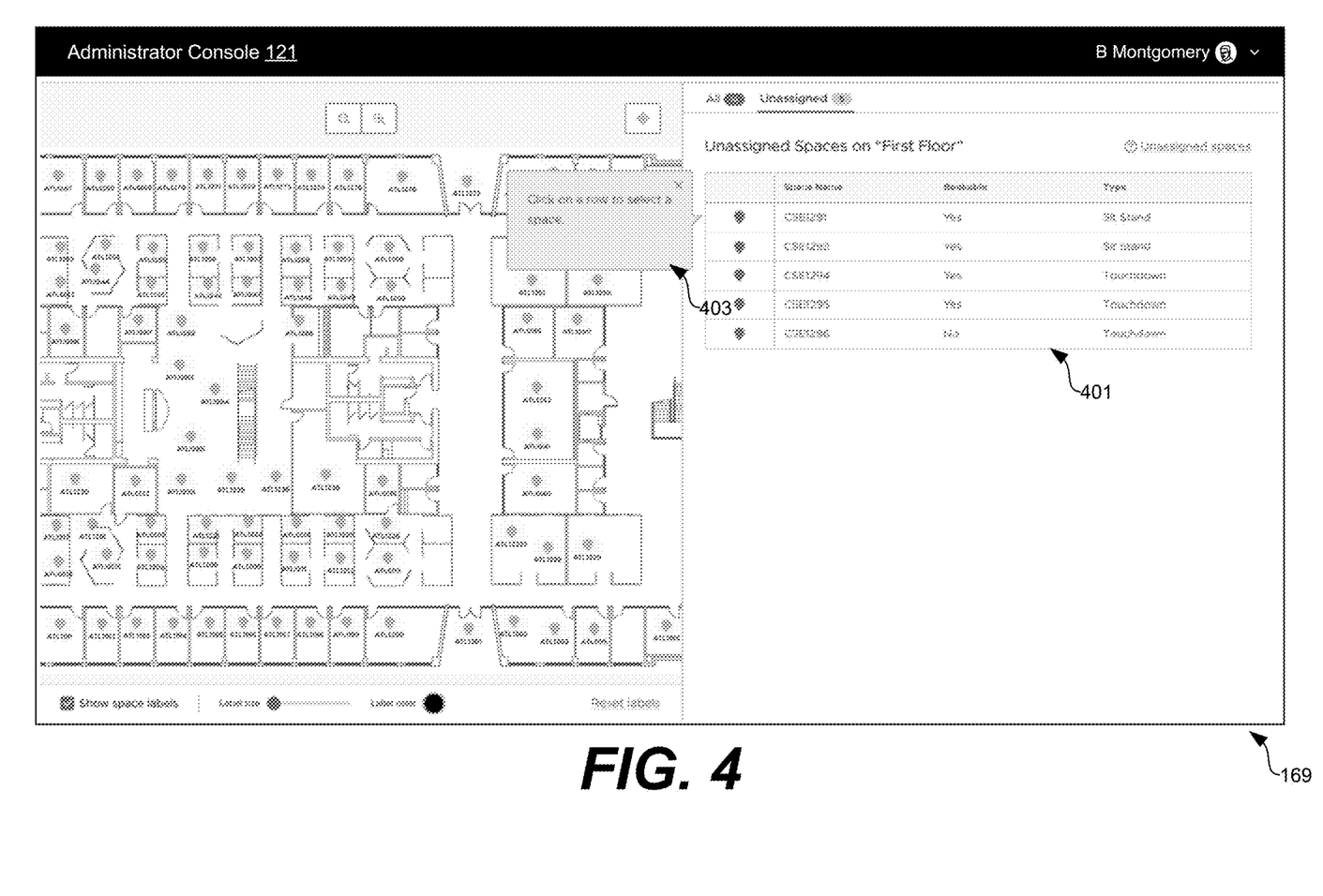
FIG. 4 is an example user interface according to examples of the disclosure.

Continuing the example of FIGS. 2-3, reference is now made to FIG. 4. In FIG. 4, the space management service 115 has identified unassigned locations that were detected within the floorplan file 128. The unassigned locations are detected by identifying text identifiers in the attribute file 132 that are not present in the floorplan file 128. The unassigned locations can be placed within a list user interface element 401. Additionally, the user interface 169 can include a tooltip 403 that instructs the user how to assign unassigned locations to locations within the floorplan that is also visualized within the user interface 169.

In examples of this disclosure, the space management service 115 can provide a user interface 169 that allow an administrative user to assign unassigned locations from the list user interface element 401 to locations within the floorplan without requiring the user to drag unassigned locations from the list user interface element 401 and drop them into the floorplan visualized within the user interface 169. Instead, the user can select an item from the list user interface element 401 by clicking or tapping on the item and then tapping or clicking on a location within the floorplan to assign the item to a location within the visualized floorplan. In response to or in an instance where the user selection of a location in the floorplan is detected, the space management service 115 can assign the unassigned location to the selected location within the floorplan. In some examples, the assignment can be saved in the data store 112 along with location data, which can be coordinates, of the location in the floorplan. The space management service 115 can then automatically, and without additional user interaction, associate a pointer in the user interface 169 to a next one of the items in the list user interface element 401.

The user can then assign the next item from the list user interface element 401 to a location within the visualized floorplan by simply clicking or tapping on an area within the visualized floorplan. In this way, after the user initially selects a row within the list user interface element 401, the user can assign N locations with N clicks or taps and without having to perform a drag and drop gesture, resulting in a more accessibility friendly user interaction.

Figure 5:
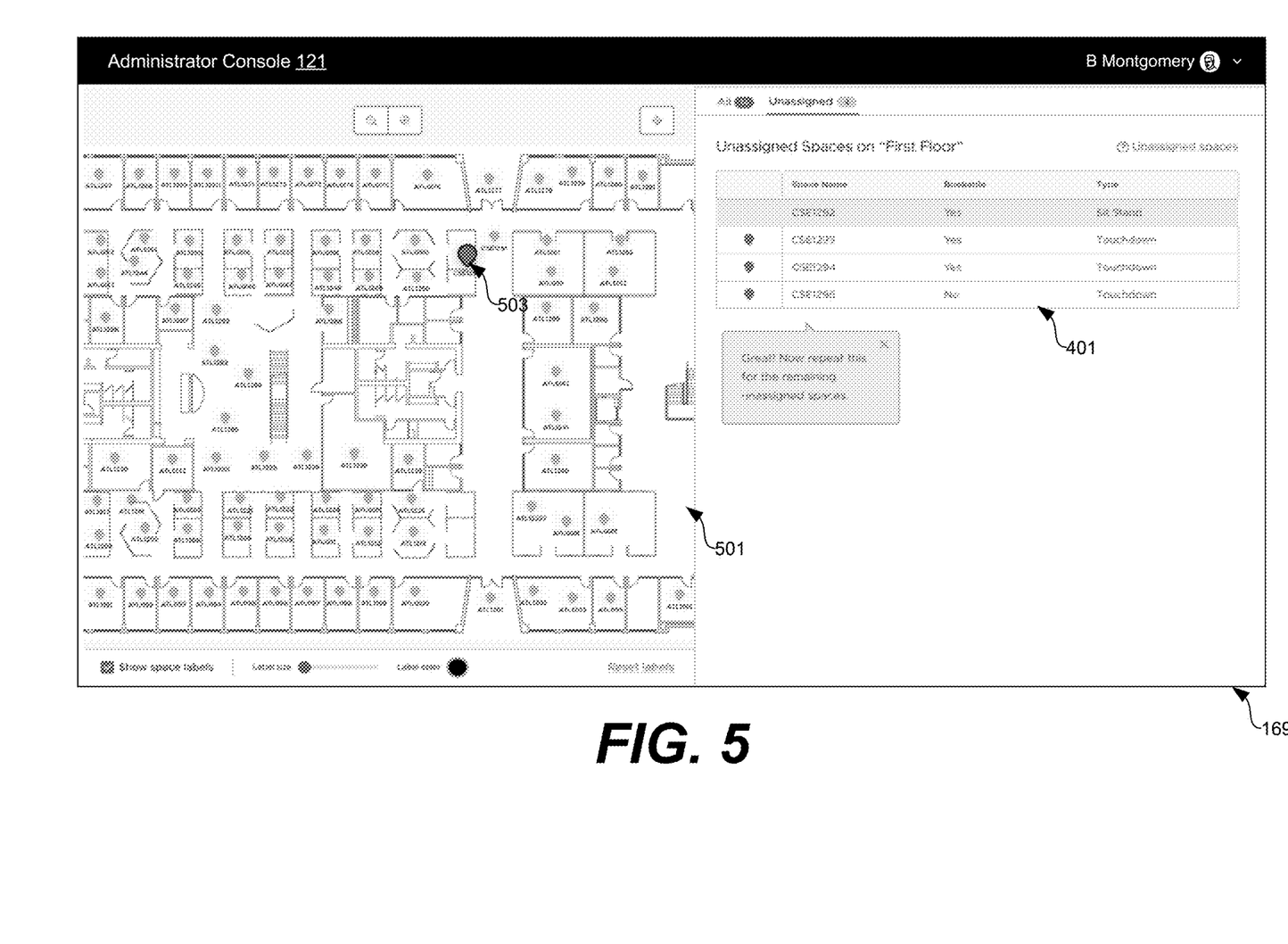
FIG. 5 is an example user interface according to examples of the disclosure.

Continuing the example of FIGS. 2-4, reference is now made to FIG. 5. In FIG. 5, the space management service 115 has detected a user selection of a location within the floorplan user interface element 501. Upon detecting the user selection, the space management service 115 can assign the unassigned location to the selected location within the floorplan. The space management service 115 can also add a location indicator 503 to the floorplan user interface element 501 indicating that the unassigned location is now assigned to the floorplan.

The user interface 169 can also associate a next one of the items from the list user interface element 401 to a pointer. The pointer can be associated with a mouse or input device associated with a client device 106 on which the user interface 169 is rendered. In some examples, such as a touchscreen device, there may be no pointer that is rendered within the user interface 169. In this scenario, the user interface 169 can associate a location from the list user interface element 401 with a tap or other type of selection gesture.

After detecting a user selection of a location within the floorplan user interface element 501 and after rendering a location indicator 503 in the floorplan user interface element 501, the user interface 169 can associate a pointer with the next item from the list user interface element 401. The user interface 169 can detect a subsequent selection of an item in the user interface 169 and associate location within the floorplan user interface element 501 with the subsequent selection. Upon detecting the subsequent selection, the user interface 169 can continue this process successively until there are no more items in the list user interface element 401.

Figure 6:
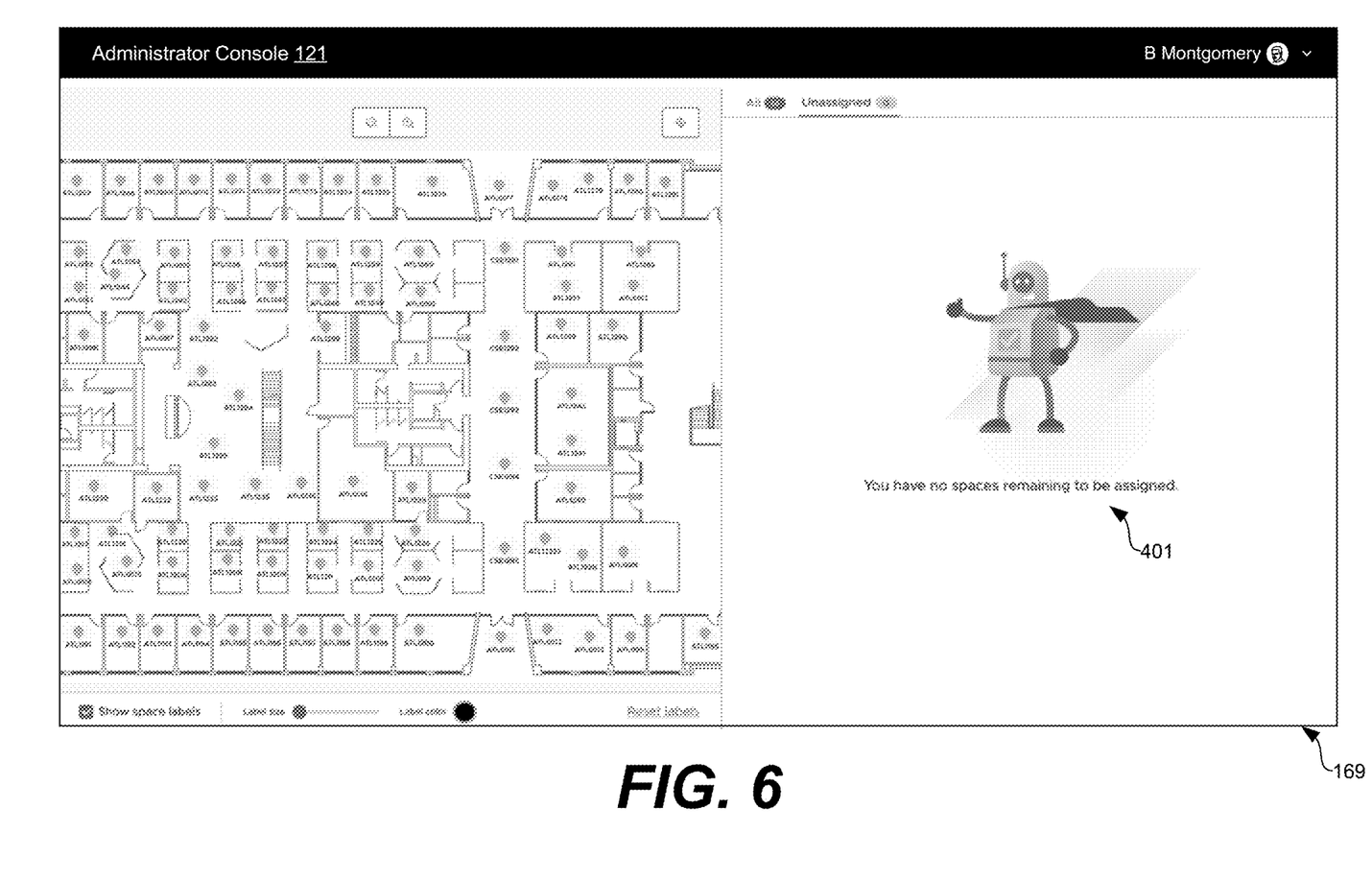
FIG. 6 is an example user interface according to examples of the disclosure.

Continuing the example of FIGS. 2-5, reference is now made to FIG. 6. In FIG. 6, the space management service 115 has detected that all of the previously unassigned locations that were in the list user interface element 401 have been assigned to locations within the floorplan user interface element 501. Accordingly, the list user interface element 401 can indicate that there are no more remaining unassigned locations in the attribute file 132 that require assignment to the floorplan.

Figure 7:
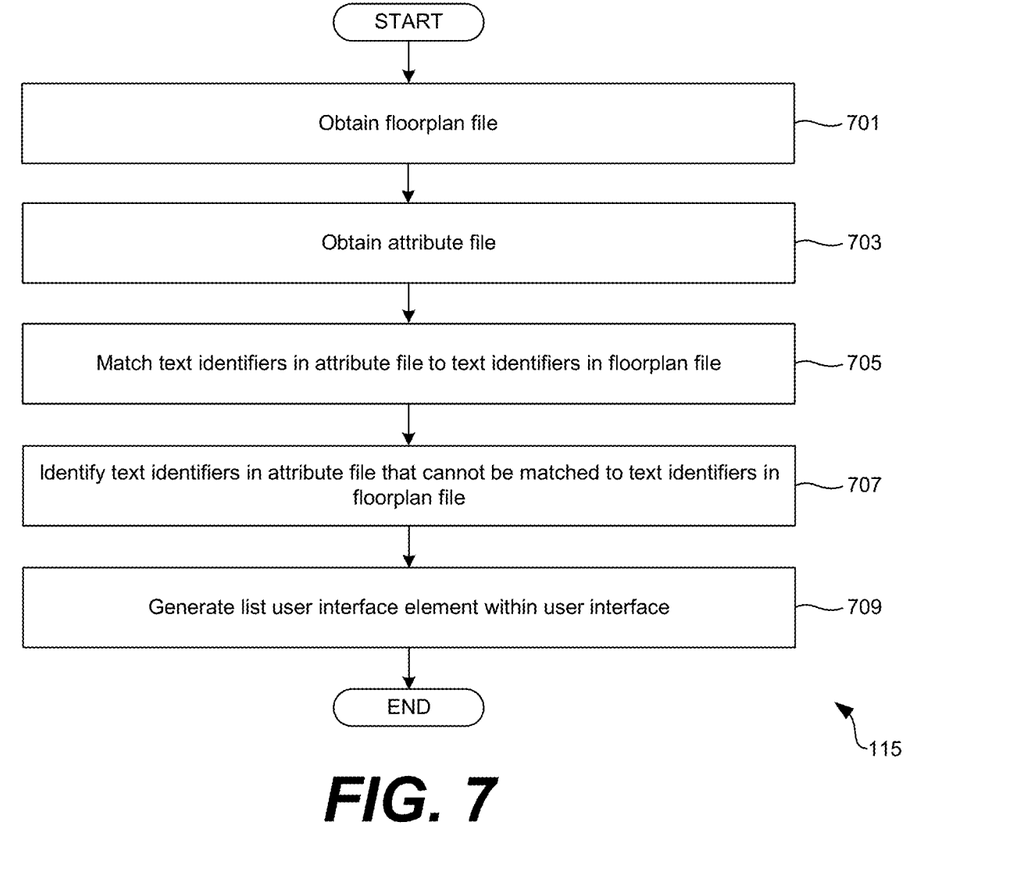
FIG. 7 is a flowchart showing an example operation of a space management service according to various examples.

Referring now to FIG. 7, a flowchart is shown that provides one example operation of the space management service 115 according to various examples. The flowchart of FIG. 7 can be viewed as depicting an example of elements of a method implemented by the computing environment 103 executing in the networked environment 100 according to one or more examples. The separation or segmentation of functionality as discussed herein is presented for illustrative purposes only.

Beginning with step 701, the space management service 115 can obtain a floorplan file 128. The floorplan file 128 can be provided to the space management service 115 through a user interface 169 provided to a client device 106. The floorplan file 128 represent a PDF file, an image, or another filetype from which a visual representation of a floorplan can be generated or extracted. The floorplan file 128 can include a map or schematic diagram of one or more floorplans associated with an enterprise facility. The floorplan file 128 can include one or more text identifiers that uniquely identify one or more locations within the floorplan with respect to other text identifiers within the floorplan file 128. In some cases, if there are duplicate text identifiers within the floorplan file 128, the space management service 115 can inform the user via a user interface element placed in a user interface 169 transmitted to a client device 106.

At step 703, the space management service 115 can obtain an attribute file 132. The user interface 169 can allow the user to upload an attribute file 132 that can specify the various attributes about the locations in a floorplan. The attributes can be selected from a predefined set of attributes that are supported by the space management service 115 in some examples of the disclosure. The attribute file 132 can identify locations using a text identifier, similar to the floorplan file 128.

At step 705, the space management service 115, after ingesting the floorplan file 128 and the attribute file 132, can match the text identifiers associated with locations defined in the attribute file 132 to locations that are marked by matching text identifiers in the floorplan file 128. The space management service 115 can automatically assign locations specified by the attribute file 132 to locations within the floorplan file 128. In some instances, an attribute file 132 may define attributes for a location and specify a location identifier that cannot be located within the floorplan file 128.

Accordingly, at step 707, the space management service 115 can identify those text identifiers within the attribute file 132 that cannot be matched within the floorplan file 128. The space management service 115 can present a user interface 169 that requests a user to specify where in the visual representation of the floorplan file 128 that the unassigned text identifiers should be placed.

At step 709, the space management service 115 can generate a list user interface element 401 within the user interface 169 that can contain the locations in the attribute file 132 that cannot be matched to locations within the floorplan file 128. The user interface 169 that includes the list user interface element 401 can allow a user to assign unassigned locations from the list user interface element 401 to locations within the floorplan without requiring the user to drag unassigned locations from the list user interface element 401 and drop them into the floorplan visualized within the user interface 169. Instead, the user can select an item from the list user interface element 401 by clicking or tapping on the item and then tapping or clicking on a location within the floorplan to assign the item to a location within the visualized floorplan. Upon detecting the user selection of a location in the floorplan, the space management service 115 can assign the unassigned location to the selected location within the floorplan. In some examples, the assignment can be saved in the data store 112 along with location data, which can be coordinates, of the location in the floorplan. The space management service 115 can then automatically, and without additional user interaction, associate a pointer in the user interface 169 to a next one of the items in the list user interface element 401.

The user can then assign the next item from the list user interface element 401 to a location within the visualized floorplan by simply clicking or tapping on an area within the visualized floorplan. In this way, after the user initially selects a row within the list user interface element 401, the user can assign N locations with N clicks or taps and without having to perform a drag and drop gesture, resulting in a more accessibility friendly user interaction.

Thereafter, the process can proceed to completion.

The client devices 106 or devices comprising the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application 130 and potentially other applications. Also stored in the memory can be a data store 112 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display 136 upon which a user interface 169 generated by the client application 130 or another application can be rendered. In some examples, the user interface 169 can be generated using user interface data provided by the computing environment 103. The client device 106 can also include one or more input/output devices that can include, for example, a capacitive touchscreen or other type of touch input device, fingerprint reader, or keyboard.

Although the space management service 115, the client application 130, the agent application 124, and other various systems described herein can be embodied in software or code executed by general-purpose hardware as discussed above, as an alternative the same can also be embodied in dedicated hardware or a combination of software/general-purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code stored and accessible from memory that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program instructions, program code, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
   at least one computing device comprising at least one hardware processor; and
   program instructions stored in memory and executable in the at least one computing device that, when executed, direct the at least one computing device to:
   obtain a floorplan file corresponding to a visual representation of a floorplan;

obtain a floorplan attribute file identifying a plurality of locations visually represented in the floorplan and at least one respective attribute for the plurality of locations;

match a subset of the plurality of locations from the attribute file to respective locations represented in the floorplan file;

identify a plurality of unassigned locations from the plurality of locations that cannot be matched to locations represented in the floorplan file;

generate a list user interface element within a user interface comprising a list of the plurality of unassigned locations;

in an instance in which a first user selection of the list user interface element is detected, associate a first one of the unassigned locations with a pointer user interface element; and in an instance in which a subsequent user selection of a first floorplan location in a floorplan user interface element is detected, associate the first one of the unassigned locations to the first user selection and associate the pointer user interface element with a next one of the unassigned locations without requiring additional user interaction with the list user interface element.

2. The system of claim 1, wherein the program instructions cause at least one computing device to at least:

detect a plurality of successive user selections of additional floorplan locations in the floorplan user interface element;

in response to the successive user selections, associate a respective next one of the unassigned locations without requiring additional user interaction with the list user interface element.

3. The system of claim 1, wherein the program instructions cause at least one computing device to match the subset of the plurality of locations from the attribute file to respective locations represented in the floorplan file by identifying a text identifier in the floorplan file that matches a respective text identifier in the attribute file.

4. The system of claim 3, wherein the at least one computing device identify a plurality of unassigned locations from the plurality of locations that cannot be matched to locations represented in the floorplan file by identifying a subset of the plurality of locations in the attribute file associated with a respective text identifier in the attribute file that does not appear in the floorplan file.

5. The system of claim 1, wherein the program instructions cause at least one computing device to at least render an indicator on the first one of the unassigned locations upon the subsequent user selection.

6. The system of claim 5, wherein the indicator comprises a location indicator rendered within the floorplan user interface element.

7. The system of claim 1, wherein the program instructions cause at least one computing device to at least render an indicator that all unassigned locations have been assigned upon detecting that the list user interface element is empty.

8. A non-transitory computer-readable medium embodying program instructions executable in at least one computing device that, when executed by the at least one computing device, direct the at least one computing device to:

obtain a floorplan file corresponding to a visual representation of a floorplan;

obtain a floorplan attribute file identifying a plurality of locations visually represented in the floorplan and at least one respective attribute for the plurality of locations;

match a subset of the plurality of locations from the attribute file to respective locations represented in the floorplan file;

identify a plurality of unassigned locations from the plurality of locations that cannot be matched to locations represented in the floorplan file;

generate a list user interface element within a user interface comprising a list of the plurality of unassigned locations;

in an instance in which a first user selection of the list user interface element is detected, associate a first one of the unassigned locations with a pointer user interface element; and in an instance in which a subsequent user selection of a first floorplan location in a floorplan user interface element is detected, associate the first one of the unassigned locations to the first user selection and associate the pointer user interface element with a next one of the unassigned locations without requiring additional user interaction with the list user interface element.

9. The non-transitory computer-readable medium of claim 8, wherein the program instructions cause at least one computing device to at least:

detect a plurality of successive user selections of additional floorplan locations in the floorplan user interface element;

upon the successive user selections, associate a respective next one of the unassigned locations without requiring additional user interaction with the list user interface element.

10. The non-transitory computer-readable medium of claim 8, wherein the program instructions cause at least one computing device to match the subset of the plurality of locations from the attribute file to respective locations represented in the floorplan file by identifying a text identifier in the floorplan file that matches a respective text identifier in the attribute file.

11. The non-transitory computer-readable medium of claim 10, wherein the at least one computing device identifies a plurality of unassigned locations from the plurality of locations that cannot be matched to locations represented in the floorplan file by identifying a subset of the plurality of locations in the attribute file associated with a respective text identifier in the attribute file that does not appear in the floorplan file.

12. The non-transitory computer-readable medium of claim 8, wherein the program instructions cause at least one computing device to at least render an indicator on the first one of the unassigned locations upon the subsequent user selection.

13. The non-transitory computer-readable medium of claim 12, wherein the indicator comprises a location indicator rendered within the floorplan user interface element.

14. The non-transitory computer-readable medium of claim 8, wherein the program instructions cause at least one computing device to at least render an indicator that all unassigned locations have been assigned upon detecting that the list user interface element is empty.

15. A method, comprising:

obtaining a floorplan file corresponding to a visual representation of a floorplan;

obtaining a floorplan attribute file identifying a plurality of locations visually represented in the floorplan and at least one respective attribute for the plurality of locations;

matching a subset of the plurality of locations from the attribute file to respective locations represented in the floorplan file;

identifying a plurality of unassigned locations from the plurality of locations that cannot be matched to locations represented in the floorplan file;

generating a list user interface element within a user interface comprising a list of the plurality of unassigned locations;

in an instance in which a first user selection of the list user interface element is detected, associating a first one of the unassigned locations with a pointer user interface element; and in an instance in which a subsequent user selection of a first floorplan location in a floorplan user interface element is detected, associating the first one of the unassigned locations to the first user selection and associate the pointer user interface element with a next one of the unassigned locations without requiring additional user interaction with the list user interface element.

16. The method of claim 15, further comprising:

detecting a plurality of successive user selections of additional floorplan locations in the floorplan user interface element;

upon the successive user selections, associating a respective next one of the unassigned locations without requiring additional user interaction with the list user interface element.

17. The method of claim 15, wherein matching the subset of the plurality of locations from the attribute file to respective locations represented in the floorplan file further comprises identifying a text identifier in the floorplan file that matches a respective text identifier in the attribute file.

18. The method of claim 15, further comprising rendering an indicator on the first one of the unassigned locations upon the subsequent user selection.

19. The method of claim 18, wherein the indicator comprises a location indicator rendered within the floorplan user interface element.

20. The method of claim 15, wherein the program instructions cause at least one computing device to at least render an indicator that all unassigned locations have been assigned upon detecting that the list user interface element is empty.

* * * * *